July 16, 1929.  V. EDLER  1,720,785
ENDLESS CHAIN HOOK RELEASE
Filed March 5, 1928

WITNESSES:
Mary S. Whiting
Tillie L. Hissong

INVENTOR.
BY VERNON EDLER
ATTORNEY.

Patented July 16, 1929.

1,720,785

UNITED STATES PATENT OFFICE.

VERNON EDLER, OF LOS ANGELES, CALIFORNIA.

ENDLESS-CHAIN HOOK RELEASE.

Application filed March 5, 1928. Serial No. 259,149.

My invention relates to improvements in endless chain belt hook releases, in which there is a channel iron through which the chain belt travels and above which is a slotted incline plane which lifts the hook and automatically disconnects it from the chain belt, that being the object of my invention.

The invention is designed to be used in conjunction with my improved automobile washing plant shown and described in Letters Patent application filed September 21st, 1927, Serial No. 220,979.

I attain the object of my invention by means of the mechanical construction illustrated in the accompanying drawings, in which—

Figure 1:
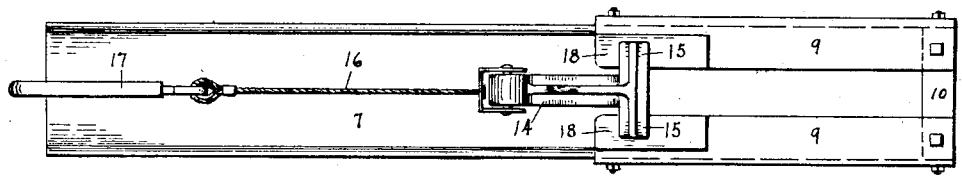
Figure 2:
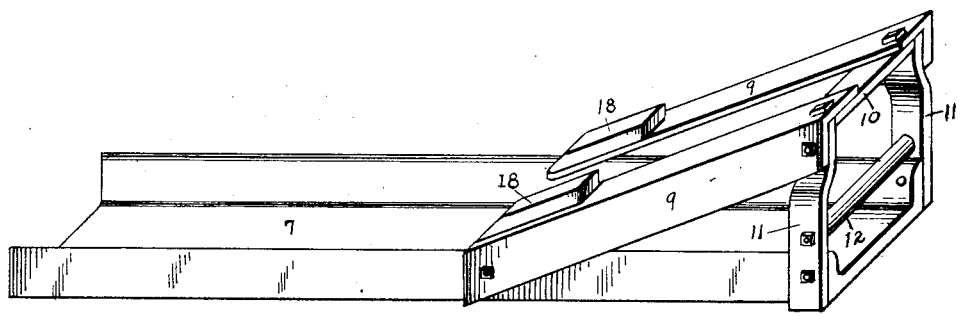
Figures 3, 4:
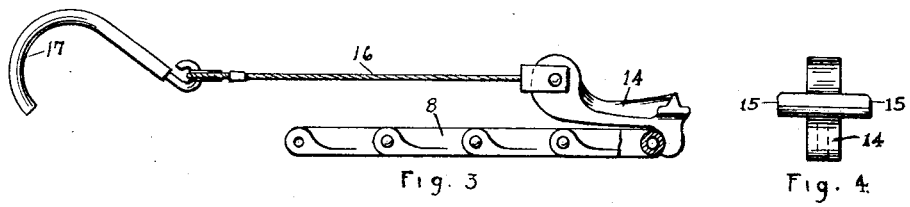

Fig. 1 is a top plan view of my invention;

Fig. 2 a perspective view of same with the double end hook omitted;

Fig. 3 a side view of a chain hook hooked into a link of the chain and connected by a cable with a rubber covered hook for connection with an automobile;

Fig. 4 a front end view of the chain hook; and

Figure 5:
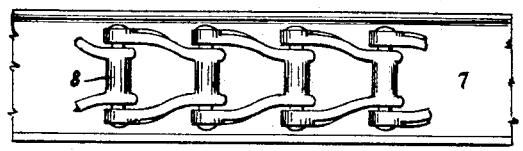

Fig. 5 a top view of a fragment of the endless chain arranged in a fragment of the channel iron.

In the drawings like reference numerals refer to the same parts throughout the several views.

Referring to the drawings in detail—

The reference numeral 7 represents the channel iron designed to be located in and near the exit end of a runway or automobile track, whereby the chain 8 travels in the channel iron as indicated in Figure 5.

Mounted on the right hand or exit end of the channel iron 7 is a slotted incline or lift comprising two angle irons 9 having their lower ends secured to the side walls of the channel iron and having their upper ends connected by an iron bar 10 and supported by two upright supports 11 having their lower ends secured to the channel iron.

Rotatably mounted at the right hand or exit end of and just above the channel iron and chain belt is a roller 12 the purpose of which will be hereinafter described. Welded or otherwise secured to the lower portion of the upper face of each angle iron is a block 18 the purpose of which will soon appear.

The chain hook 14 has on either side over the hook end a wing 15 adapted when the hook approaches the incline to slide up the incline and automatically lift the hook and disconnect it from the chain and thereby avoid injury that might occur to the chain or hook if the latter was not detached at the proper time.

The chain hook 14 is connected by a cable 16 with a rubber covered hook 17 for connection with an automobile that is to be drawn over the track by the endless chain.

In use the operation of my invention is as follows:

To pull an automobile over the track, as described in my application Serial No. 220,979, the rubber covered hook 17 is secured to the automobile axle or bumper and the chain hook 14 connected with the moving endless chain belt. As the automobile nears the end of the track the chain hook wings 15 are caused by the pull of the chain to slide up the incline and thus raise the hook and automatically disconnect it from the chain. The roller 12 prevents the hook from lifting the chain belt when the incline is lifting the hook. In the operation the hook wings pass beyond the upper end of the blocks 18 which prevent the hook from sliding back down the incline and reengaging the chain as it might otherwise do. The chain hook is then removed by an attendant from the incline and the other hook from the automobile and the latter is ready to leave the track.

As there are modifications in mechanical construction that could be made without departing from the spirit of my invention I do not wish to be limited to the particular construction shown and described.

Having thus described my invention, what I claim as new and desire to protect by Letters Patent, is—

1. In a mechanism of the character described, a channel, an endless chain traveling in said channel, a slotted incline above the channel, and a hook connected with and drawn by the chain and having portions adapted to travel up the incline plane and raise the hook and automatically disconnect it from the chain belt.

2. In an endless chain hook release, a channel, an endless chain adapted to travel in said channel, an incline plane above the chain, and a hook adapted to be connected with the chain belt and having a portion overlapping and adapted to slide up the incline plane and lift the hook and automatically disconnect it from the chain belt.

3. In a mechanism of the character described, a channel, an endless chain belt adapted to travel in said channel, an incline plane arranged above the channel, a hook adapted to be connected with the chain belt and having portions overlapping the incline plane and adapted when drawn by the chain belt to slidably ascend the incline plane whereby the hook will be lifted and automatically disconnected from the chain belt, and means secured to the incline plane and adapted to prevent the hook from sliding down the incline plane after having been disconnected from the chain belt.

4. In a mechanism of the character described, a channel, an endless chain belt adapted to travel in said channel, an incline plane arranged above the channel, a hook adapted to be connected with the chain belt and having portions overlapping the incline plane and adapted when drawn by the chain belt to slidably ascend the incline plane whereby the hook will be lifted and automatically disconnected from the chain belt, and means adapted to prevent the hook from raising the chain when ascending the incline plane.

5. In an apparatus for automatically disconnecting hooks from a moving endless chain belt, a stationary incline, an endless chain belt arranged to travel under said incline, and a hook adapted to be connected with the said chain belt and having a portion adapted when drawn by the chain belt to travel up the incline and thereby lift the hook and disconnect it from the chain belt.

6. In an apparatus for automatically disconnecting hooks from a moving endless chain belt, the combination with an endless chain belt, of a stationary incline arranged above and adjacent to the chain belt, a hook adapted to be connected with the said chain belt and having a portion adapted when drawn by the chain belt to travel up the incline and thereby lift the hook and disconnect it from the chain belt, and means to prevent the hook from lifting the chain belt while ascending the incline.

7. In an apparatus for automatically disconnecting hooks from a moving endless chain belt, a stationary incline, an endless chain belt arranged to travel under said incline, a hook adapted to be connected with the said chain belt and having a portion adapted when drawn by the chain belt to travel up the incline and thereby lift the hook and disconnect it from the chain belt, and means to prevent the hook from sliding down the incline after having been disconnected from the chain belt.

8. In an apparatus for automatically disconnecting hooks from a moving endless chain belt, a stationary incline, an endless chain belt arranged to travel under said incline, a hook adapted to be connected with the said chain belt and having a portion adapted when drawn by the chain belt to ascend the incline and thereby lift the hook and disconnect it from the chain belt, and a roller rotatably arranged above the chain belt to prevent the hook from lifting the chain belt while ascending the incline.

9. In an apparatus for automatically disconnecting hooks from a moving endless chain belt, a stationary incline having therein a slot, an endless chain belt arranged to travel under said slot, a hook adapted to be connected with the said chain belt and having an upper portion adapted to enter and travel in said slot and having an uppermost portion over-hanging the incline on either side of slot and adapted when drawn by the said chain belt to slide up the incline and lift the hook and disconnect it from the chain belt.

10. In an apparatus for automatically disconnecting hooks from a moving endless chain, an incline adapted to have an endless chain travel thereunder, and a hook adapted to be connected with and drawn by said such endless chain and having a portion adapted when so drawn to approach and travel up the said incline and lift the hook and disconnect it from said chain.

11. In an apparatus for automatically disconnecting hooks from a moving endless chain, an incline provided with a slot and adapted to have an endless chain travel thereunder, and a hook adapted to be connected with and drawn by a said such endless chain and having a portion adapted when so drawn to enter and travel in said slot and having an uppermost portion overhanging and adapted to ascend the incline and lift the hook and disconnect it from said chain.

In testimony whereof I affix my signature.

VERNON EDLER.